UNITED STATES PATENT OFFICE.

LUDWIG WEISS, OF BERLIN-CHARLOTTENBURG, GERMANY.

PROCESS OF MANUFACTURING ALLOYS.

1,065,855.  Specification of Letters Patent.  Patented June 24, 1913.

No Drawing.   Application filed November 28, 1910.  Serial No. 594,538.

*To all whom it may concern:*

Be it known that I, LUDWIG WEISS, a subject of the Emperor of Austria and King of Hungary, residing at Berlin-Charlottenburg, Empire of Germany, have invented certain new and useful Improvements in the Process of Manufacturing Alloys; and I do hereby declare the following to be a full, clear, and exact description of the invention, such as will enable others skilled in the art to which it appertains to make and use the same.

My invention relates to a process for manufacturing alloys.

The essential feature of my improved process consists in intimately mixing the constituent parts, the two or more metals which have to be united for forming the alloy to be obtained in the cold state, one of such parts or metals being in the form of fine chips or of a coarse powder while the other constituent part of the alloy to be formed, that is to say, the other metal or mixture of metals to be united with the first named coarsely comminuted constituent or metal for forming the alloy desired is in the form of a fine powder. To the mixture of the said constituent parts slag forming fluxes may be added if desired, whereby the agglutinant holds in contact the more refractory constituent with the less refractory constituent while the latter is being melted. The said constituent parts are mixed in the cold dry state, the pulverulent constituent being attached to the surface of the chips by means of an agglutinant. The chips are then formed into lumps or bricks by means of pressure which are melted in a suitable furnace preferably in a cupola furnace. The agglutinant may be of any desired character, but its melting temperature must be as high or higher than that of the metal chips under treatment, so that on melting the lumps or bricks formed of the metal chips, the agglutinant does not melt and does not take with it the fine powder, whereby the latter would be removed from the lumps or bricks. The agglutinant may be of any desired character provided that it be adhesive, preferably it is so selected that it also serves as a slag forming agent. As such agglutinant preferably water glass may be used to which the oxids of the metals to be alloyed may be added. These oxids need not be chemically pure, products of metallurgical processes such as zinc dust, tin ashes and the like or calamin, etc., may be used. Water glass forms with these oxids highly refractory agglutinants.

When alloys of iron have to be manufactured, peroxid of manganese or oxid of magnesium or instead of the oxids of metals ground and washed chalk is preferably added to the water glass. In case of readily fusible metals borax may be added to the water glass. If metals other than iron have to be treated, metal chlorids may be employed as agglutinants instead of water glass. This process permits of the manufacture of highly homogeneous alloys and prevents the metals to be alloyed from turning out from the mixtures on melting them. This process is applicable to the manufacture of any alloys of such metals that are obtainable in the form of chips or coarse powders and in the form of fine powders respectively.

The process is applicable with particular advantage for manufacturing such alloys, one of the constituent parts of which is infusible or highly refractory, but soluble in the other constituent part or parts, thus for instance, for converting steel or ingot iron into cast iron which is very important for utilizing waste iron such as turning chips and the like. For utilizing such waste iron it has been proposed to form it by pressure into lumps or bricks and to melt the latter in the cupola or in the crucible furnace. Such waste iron consists in the majority of cases of steel or ingot iron that is to say of exceedingly pure iron which is more particularly free from sulfur and phosphorus, and which would be particularly suitable for the manufacture of cast iron of superior quality if it could be readily enriched in carbon and silicon. The latter is, however, not the case, the lumps or bricks do not at all absorb carbon, silicon, manganese, etc., in the cupola furnace and therefore the lumps or bricks made of chips of steel or ingot iron could be used heretofore only in relatively small quantities up to 10 per cent. A further inconvenience in the use of lumps or bricks as heretofore made consists in that the carbon, silicon, manganese and the like burn out even from the pig iron added because the lumps or bricks behave in the charge the same as the steel chips, cuts or the like added to pig iron for obtaining castings of a particular good quality. The object of such addition was to improve the equality of the casting and not to utilize these additions; for this reason it would have been desirable in many cases to be able to melt larger quantities of steel together with the pig iron. The percentage of steel could not in this case exceed 5 to 10 per cent. of the charge because the melting temperature of steel is much higher than that of pig iron so that if the steel too had to be molten this would take so much time that carbon, manganese and silicon of the pig iron would burn out and the cast iron would become richer in sulfur. The above described process avoids these difficulties, the carbon and the silicon being intimately mixed in the form of a fine powder with the chips of steel or ingot iron in the lumps or bricks so that the carbon and the silicon may be readily absorbed by the highly heated, but not yet molten steel, thus reducing the melting temperature of the steel.

During melting the carbon and the silicon are protected against the action of the air and flames so that they are not burned and are completely incorporated into the steel. This action cannot be secured by adding pieces of charcoal or ferrosilicon to steel lumps made in a way other than that above described when they are brought into the pig iron on charging because the contact of the steel with the carbon or ferrosilicon is not sufficiently intimate in the cupola furnace and the carbon and silicon are not absorbed by the steel pieces or lumps, therefore the pig iron will melt prior to the melting of the steel and the carbon and silicon will burn before the steel melts.

An example of carrying this process into practice is the following: The chips of steel or ingot iron are comminuted and mixed with a fine powder of charcoal, ferrosilicon and silicic acid (sand) in the cold and dry state. As regards the percentage of the last named constituents it has to be borne in mind that the absorption of carbon and the other ingredients to be incorporated into the steel or ingot iron takes place on fusion almost quantitatively and that the amount of silicon absorbed is even slightly greater than that corresponding to the quantity of ferrosilicon added because in the course of the melting part of the silicon of the silicates used is set free as has been shown by exact chemical analyses. To the mixture thus prepared an agglutinant is added the melting temperature of which is not lower than that of cast iron, preferably sodium or potassium silicate (water glass) to which peroxid of manganese has been added. The water glass also serves as a slag forming agent which is of importance because the chips to be treated are never entirely free from oxides and the presence of such oxides has a marked detrimental influence upon the final product if cast iron of superior quality has to be produced. This makes it desirable to remove the oxides by the formation of a comparatively large quantity of slag. The mixture thus obtained is then formed into lumps or bricks by means of a suitable press and these lumps or bricks are melted in a cupola furnace with ordinary cast iron. The quantity of these lumps or bricks may amount to 50 per cent. and even more of the entire charge, the cast iron is the more pure or contains the less sulfur and phosphorus the greater the quantity of said lumps or bricks is. It has been found by experiment that with lumps or bricks prepared as above described with an addition of 1 per cent. of charcoal powder, a quantity of ferrosilicon corresponding to 0.25 per cent. of silicon and 1 per cent. of silicic acid (sand) in the final product, the percentage of carbon and silicon rises notably with an increasing addition of such lumps or bricks, while the percentage of sulfur, phosphorus and manganese diminishes. In these experiments always the same pig iron has been used. Chilled castings of cast iron obtained from a charge containing 30 per cent. of steel were found to be perfectly gray all over their transverse section and did not possess a hard skin. In some cases also other additions such as ferromanganese and the like are incorporated into the lumps or bricks in order to effect the desulfurizing of the pig iron by the formation of a manganiferous slag.

The process may be used not only for converting steel or ingot iron into cast iron but also for producing any alloys of such metals that are obtainable in the form of chips or coarse powder and in the form of fine powder respectively.

Claims:

1. A process of manufacturing alloys consisting in intimately mixing a finely powdered constituent with an adhesive agglutinant whereby the particles of such powdered constituent are embedded in the agglutinant, mixing the mass with a coarsely comminuted constituent, the melting temperature of the agglutinant exceeding that of the least refractory constituent, forming the mixture into lumps by pressure and melting such lumps after setting substantially as and for the purpose described.

2. A process of manufacturing alloys consisting in intimately mixing a finely powdered constituent with an adhesive agglutinant whereby the particles of such powdered constituent are embedded in the agglutinant, mixing the mass with a coarsely comminuted constituent, the agglutinant having a melting temperature exceeding that of the least refractory constituent and being adapted to form a slag, forming the mixture into lumps by pressure and melting the said lumps after setting, substantially as and for the purpose described.

3. A process of manufacturing alloys consisting in intimately mixing a finely powdered constituent and an adhesive agglutinant consisting of water glass with the addition of metal compounds, whereby the particles of such powdered constituent are embedded in the agglutinant, mixing the mass with a coarsely comminuted constituent, the said agglutinant having a melting temperature exceeding that of the least refractory of the constituents, forming the mixture into lumps by pressure and melting the said lumps after setting, substantially as and for the purpose described.

4. A process of manufacturing alloys consisting in intimately mixing a finely powdered constituent and an adhesive agglutinant consisting of water glass with an addition of metal oxids, mixing the mass with a coarsely comminuted constituent, the agglutinant having a melting temperature exceeding that of the least refractory of the constituents, forming the mixture into lumps by pressure and melting such lumps after setting, substantially as and for the purpose described.

5. A process of manufacturing alloys consisting in intimately mixing a finely powdered constituent and an adhesive agglutinant whereby the particles of the finely powdered constituent are embedded in the said agglutinant, mixing the mass with a coarsely comminuted constituent, the agglutinant having a melting temperature not exceeding that of the least refractory constituent, forming the mixture into lumps by pressure and melting the said lumps after setting in the presence of a metal, substantially as and for the purpose described.

In testimony whereof, I affix my signature, in presence of two witnesses.

LUDWIG WEISS.

Witnesses:
ARTHUR BAUMBURY,
AUGUST FUGGER.